United States Patent [19]
Verot

[11] Patent Number: 5,634,620
[45] Date of Patent: Jun. 3, 1997

[54] CLAMP ASSEMBLY FOR MOTOR FLUSHING DEVICE

[76] Inventor: Thierry R. E. Verot, One Key Capri, 402 East, Treasure Island, Fla. 33706

[21] Appl. No.: 337,039

[22] Filed: Nov. 10, 1994

[51] Int. Cl.$^6$ .................................................. A44B 96/06
[52] U.S. Cl. ........................ 248/229.14; 248/230.5; 248/316.6; 248/558
[58] Field of Search .............. 248/229, 231.61, 248/316.6, 558, 230, 219.4, 912, 911, 207, 126, 229.1, 229.14, 229.24, 230.1, 230.5; 440/88, 113; 24/129 R, 135 A, 136 B

[56] References Cited

U.S. PATENT DOCUMENTS

| | | | |
|---|---|---|---|
| 1,107,811 | 8/1914 | Lucas | 248/207 |
| 3,002,488 | 10/1961 | Guhlin | 115/17 |
| 3,146,982 | 9/1964 | Budnick | 248/229 |
| 3,888,354 | 6/1975 | Margolin | 248/231.61 |
| 3,931,828 | 1/1976 | Lawler | 134/167 R |
| 4,246,863 | 1/1981 | Reese | 440/88 |
| 4,359,063 | 11/1982 | Carlson | 134/167 R |
| 4,540,009 | 9/1985 | Karls | 134/167 R |
| 4,729,383 | 3/1988 | Susi | 128/681 |
| 4,973,276 | 11/1990 | Mayrelis | 440/113 |

*Primary Examiner*—Karen J. Chotkowski
*Assistant Examiner*—Gwendolyn Wrenn
*Attorney, Agent, or Firm*—John C. Garvin, Jr.

[57] ABSTRACT

A universal clamp assembly for remotely placing a motor flushing device over the water inlet ports of an outdrive of a marine motor from either above (twelve o'clock position), below (six o'clock position), to the right (three o'clock position), or to the left (nine o'clock position) of the motor to direct clean, fresh, water through the inlet ports to flush the interior of the motor. In a second embodiment of the universal clamp assembly as depicted in FIG. 3, the universal clamp assembly comprises a first, generally T-shaped, clamp member including a foundation for securing a motor flushing device thereto in a first orientation; and a second, generally Y-shaped, clamp member including a foundation for alternatively securing a motor flushing device thereto in a second orientation. When assembled, the foundation of the first clamp member is in a plane generally perpendicular with the foundation of the second clamp member.

24 Claims, 3 Drawing Sheets

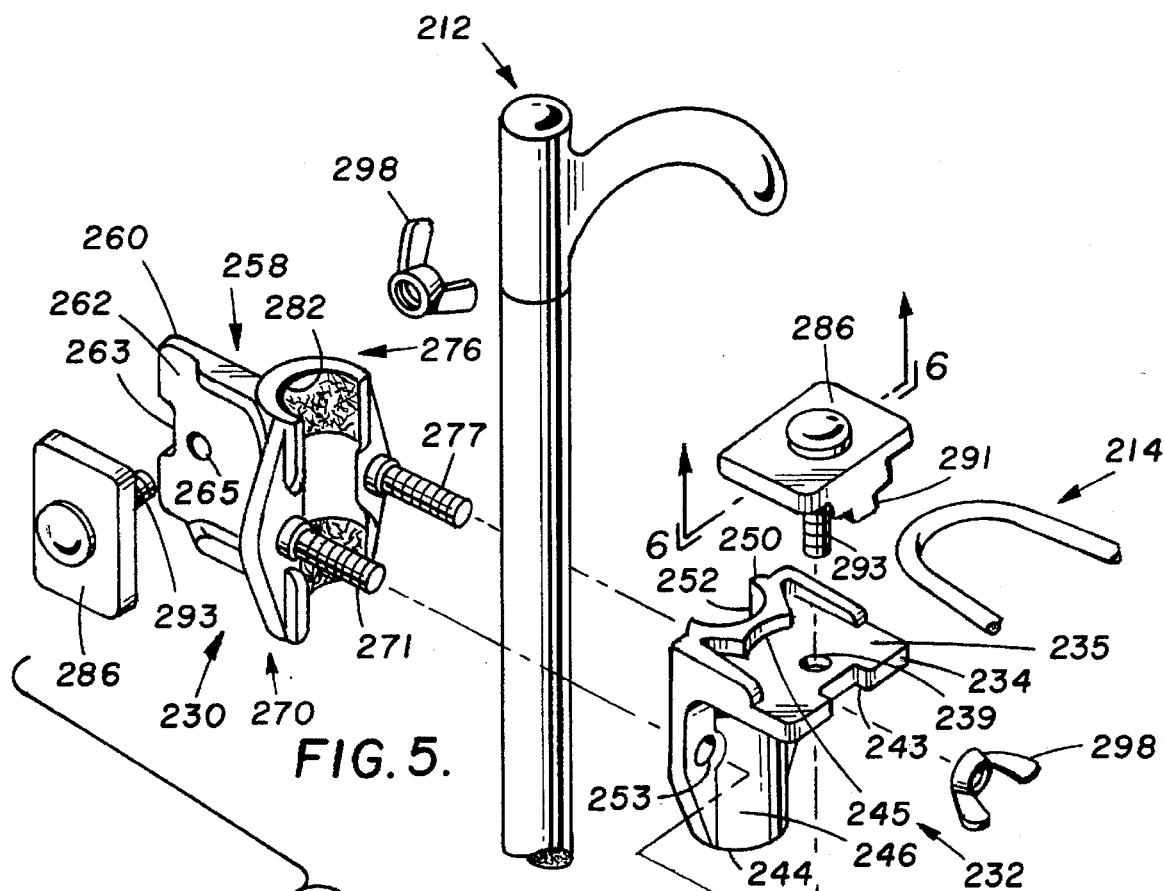
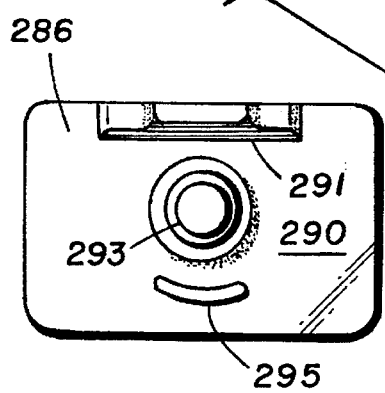
FIG. 5.
FIG. 6.

CLAMP ASSEMBLY FOR MOTOR FLUSHING DEVICE

FIELD OF THE INVENTION

This invention relates to a universal clamp (connector) assembly, and more particularly to a universal clamp (connector) assembly adapted to be secured to a conventional motor flushing device and a pole for placing the flushing device over a water inlet in the outdrive of an outboard motor or inboard-outboard motor from either side of, or from either the top or bottom of, the foot of the outdrive for flushing the motor.

BACKGROUND OF THE INVENTION

Outboard and inboard-outboard motors for boats have enjoyed wide popularity and success for many years. Due to the fact that these motors are quite expensive, it is of prime importance to the owners thereof to receive maximum use of the motors as long as operable life is possible. To attain maximum years of operation of a boat motor, it is essential that preventive maintenance be performed by the owner. A major preventive maintenance measure that must be taken by an owner of a boat with a motor thereon is to periodically flush and clean the motor with fresh, unsalted, water especially when the motor is used in a saltwater environment.

To accomplish the internal cleaning of such motors, the general procedure is to force clean, fresh, water into the interior of the motor through the cooling inlet ports in the outdrive of the motor. In normal running operation of the motor, the inlet ports allow water to be circulated within the motor for cooling purposes. By forcing clean, unsalted, water through the motor by use of a flushing device, the clean, fresh, water cleanses or removes saltwater or corrosion from the working parts of the motor.

Numerous prior art devices are in existence and are commercially available which are designed to force clean, fresh, water through the inlet ports and motor to cleanse and flush many of the working parts of the motor. These devices take many forms and are represented in the following United States patents: U.S. Pat No. 3,002,488 to Guhlin; U.S. Pat. No. 3,931,828 to Lawler; U.S. Pat. No. 4,246,863 to Reese; U.S. Pat. No. 4,359,063 to Carlson; U.S. Pat. No. 4,540,009 to Karis; U.S. Pat. No. 4,729, 393 to Ferguson; and U.S. Pat. No. 4,973,276 to Mavrelis.

While each of the prior art devices identified hereinabove are useful to accomplish the forcing of clean, fresh, water through a motor to cleanse and flush the interior of a motor, each requires the placement of a flushing device over the water inlet ports on the foot of the outdrive of the motor. This placement, due to the inherent design of each device, often becomes extremely inconvenient and possibly dangerous particularly since the cleaning and flushing of the motor most often occurs when the motor, together with the boat, is supported on davits or cradle lifts in a suspended fashion several feet above the water. With the boat and motor in such suspended position, each of the flushing devices of the prior art devices identified hereinabove, with the exception of those disclosed in U.S. Pat. Nos. 4,246,863 and 4,973,276, require direct access to the water inlet ports in the foot of the outdrive of the motor. Thus, the person doing the flushing must position himself in the water or suspend himself out of the boat in a perilous position.

While each of U.S. Pat. Nos. 4,246,863 and 4,973,276 teaches the use of rigid poles or rods for placing the flushing device over the water inlet ports in the foot of the outdrive of an outboard motor or an inboard-outboard motor from either the starboard (right) of the boat or the port (left) of the boat, none of the known prior art apparatuses allows the ready and unperilous placing of the flushing device over the water inlet ports from any of four directions, each being displaced approximately ninety degrees from one another at the twelve, three, six and nine o'clock positions. That is, none of the prior art apparatuses allow the safe and remote placement of the flushing device over the inlet ports of the outdrive of the motor from the right and left of the boats as well as from within the boat (above the motor) and below the boat and motor.

Accordingly, there is a need for a universal clamp (connector) assembly for supporting a flushing device to allow a person to place the flushing device over the water inlet ports of a motor of a suspended boat from any of four remotely located positions without subjecting the person to uncomfortable or possibly perilous situations.

SUMMARY OF THE INVENTION

In accordance with the present invention, a universal clamp (connector) assembly is provided for remotely placing a conventional flushing device over the inlet ports in the foot of an outdrive of an outboard motor or an inboard-outboard motor from either above (twelve o'clock position), below (six o'clock position), to the right (three o'clock position) of, or to the left (nine o'clock position) of the motor for the purpose of directing clean, fresh, water through the inlet ports to flush and cleanse the interior of the motor.

In a first embodiment, the universal clamp (connector) assembly comprises a first, generally L-shaped, clamp member including a first leg, a second leg, means associated with the second leg for securing a conventional motor flushing device thereto, and a surface for engaging a pole; and a second generally Y-shaped, clamp member including a foundation, a first fork, a second fork, means associated with the foundation for securing a conventional motor flushing device thereto, and a surface for engaging a pole. The second leg of the first, generally L-shaped, clamp member and the foundation of the second, generally Y-shaped, clamp are orientated such when assembled that they lie in planes perpendicular to each other. With this structure, it is possible for a person, after securing the universal clamp (connector) assembly to a pole, to select to secure the conventional motor flushing device to either the first leg of the generally L-shaped clamp member or the foundation of the generally Y-shaped clamp member and be able to place the conventional motor flushing device over the inlet ports of a motor remotely from either above, below, to the right of, or to the left of the motor.

In a second embodiment of the invention, the universal clamp (connector) assembly comprises a first, generally T-shaped, clamp member including a foundation, a pair of arms, means associated with the foundation for securing a conventional motor flushing device thereto, and a surface for engaging a pole; and a second generally Y-shaped, clamp member including a foundation, a first fork, a second fork, means associated with the foundation for securing a conventional motor flushing device thereto, and a surface for engaging a pole. The foundation of the first, generally T-shaped, clamp member and the foundation of the second, generally Y-shaped, clamp are orientated such when assembled that they lie in planes perpendicular to each other. With this structure, it is possible for a person, after securing the universal clamp (connector) assembly to a pole, to select to secure the conventional motor flushing device to either the foundation of the generally T-shaped clamp member or the foundation of the generally Y-shaped clamp member and be able to place the conventional motor flushing device over the water inlet ports of a motor remotely from either above, below, to the right of, or to the left of the outboard motor.

Accordingly, it is an object of the present invention to provide a universal clamp (connector) assembly that can be easily mounted on a pole and connected to a conventional motor flushing device over the inlet ports in the foot of the 5 outdrive of an outboard motor or inboard-outboard motor remotely from either above, below, to the right of, or to the left of the motor.

It is a further object of the present invention to provide a universal clamp (connector) assembly made of readily available and inexpensive material that can be connected to a pole and a conventional motor flushing device to allow a person to place the flushing device over the water inlet ports in an outboard motor or inboard-outboard motor to cleanse the interior of the motor from either above, below, to the right of, or to the left of the motor.

These objects as well as other objects and advantages of the present invention will become apparent to those skilled in the art after reading the following description of the preferred embodiments in conjunction with the accompanying drawings, and the appended claims.

BRIEF DESCRIPTION OF THE DRAWINGS

"FIG. 5 is an exploded, perspective, view of a third embodiment of the clamp (connector) assembly of the present invention together with a partially broken away boat hook pole and flushing device to be used with the clamp (connector) assembly. FIG. 6 is a view along line 6—6 of FIG. 5 showing the underside of the plate used to secure the flushing device to the clamp (connector) assembly depicted in FIG. 5."

DETAILED DESCRIPTION OF THE INVENTION

Figure 1:
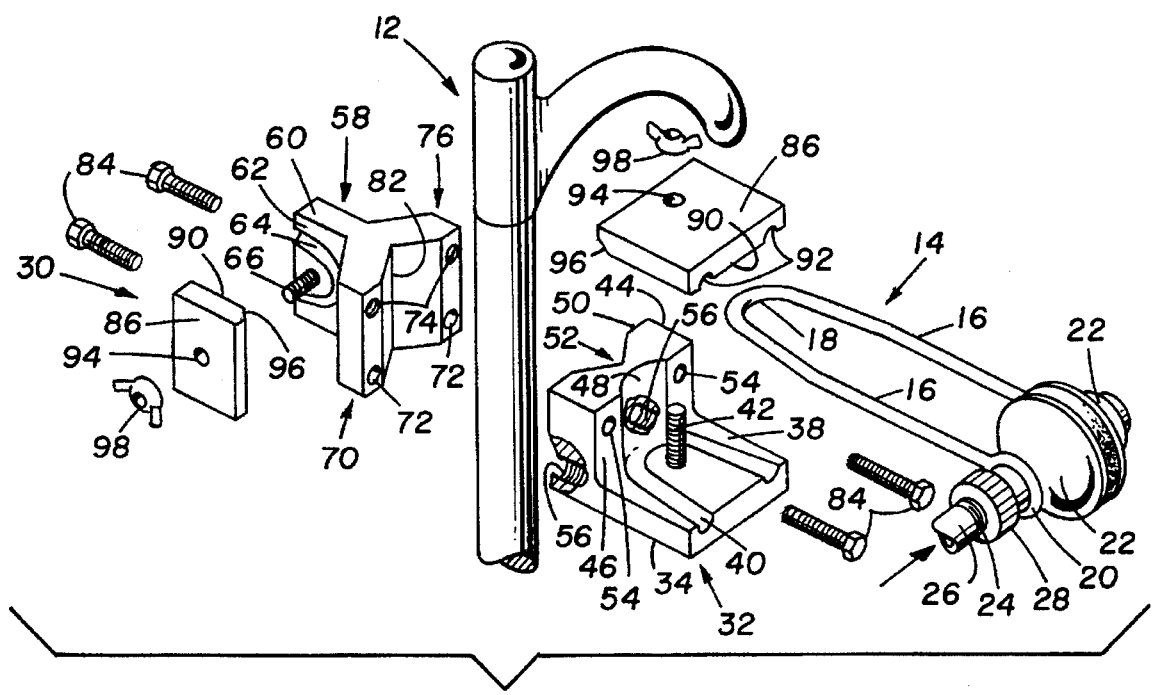
FIG. 1 is an exploded, partially broken away, perspective, view of a first embodiment of the clamp (connector) assembly of the present invention together with a partially broken away boat hook pole and flushing device to be used with the clamp (connector) assembly.
Figure 2:
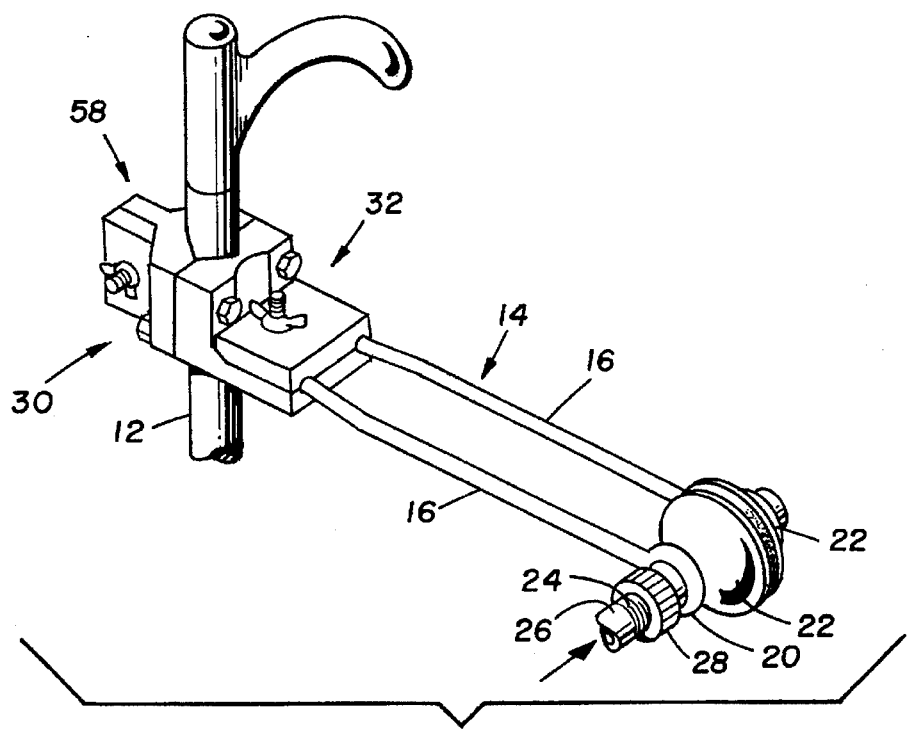
FIG. 2 is a perspective view of the clamp (connector) assembly of the embodiment of the present invention depicted in FIG. 1 secured to a partially broken away boat hook pole and a flushing device set up to place the flushing device over the water inlet ports of a motor on a suspended boat from either above or below the motor.
Figure 4:
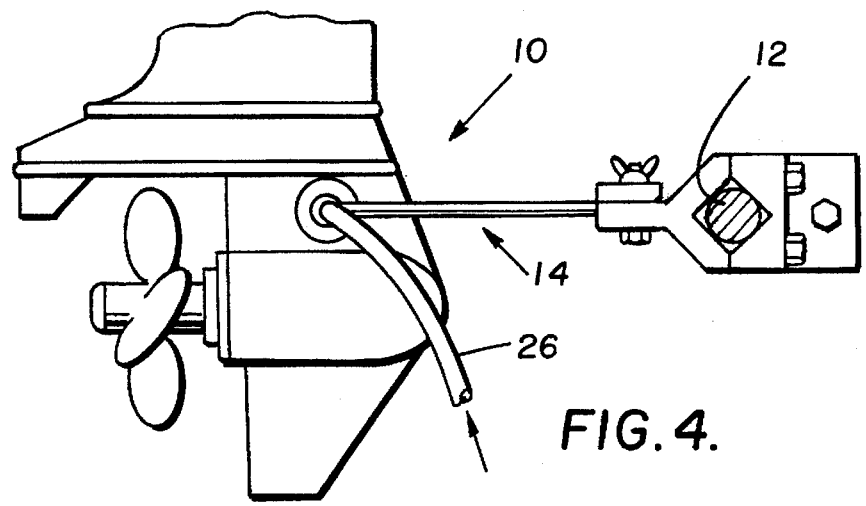
FIG. 4 is a perspective view of the clamp (connector) assembly of either embodiment of the present invention secured to a partially broken away boat hook pole and a flushing device to place the flushing device over the water inlet ports of a motor on a suspended boat from either the starboard or port of the boat.

Referring now to the drawings, reference numeral 10 (FIG. 4) generally designates the foot of an outdrive of an outboard motor or inboard-outboard motor attached to a boat (not shown) suspended on davits or cradle lifts (not shown), reference numeral 12 designates a conventional boat hook pole, and reference numeral 14 designates one conventional type of motor flushing device. Flushing device 14 comprises a generally U-shaped main body 16 having a curved intermediate section 18 and a pair of eyelets 20 at its outer ends, and a pair of resilient gripping and sealing cups 22 normally made of rubber secured within the eyelets 20. An example of a conventional flushing device of the type used with the present invention is disclosed in U.S. Pat. No. 3,931,828 to Lawler, which conventional flushing device is often referred to as "ear muffs". As best shown in FIGS. 1 and 2, one cup 22 of flushing device 14 has an internally threaded female hose coupling 28 connected thereto for engaging the external male threads 24 on one end of a conventional garden hose 26. A first embodiment of the universal clamp (connector) assembly of the present invention is designated by the reference numeral 30 and is best shown in FIGS. 1 and 2. Universal clamp (connector) assembly 30 generally comprises a first clamp member or bracket 32, a second clamp member or bracket 58, a plurality of bolts 84, a pair of plates 86, and a pair of wing nuts 98. Referring now to FIG. 1, first clamp member 32 is generally L-shaped and comprises a first leg 34 having an upper surface 38, a generally U-shaped recess 40 in upper surface 38, and an externally threaded bolt 42 fixed to first leg 34 and extending within U-shaped recess 40 and from upper surface 38; and a second leg 44 fixed to first leg 34 and having an outside surface 46 which includes an arcuate groove 48, an inside surface 50 having a generally V-shaped groove 52, a pair of unthreaded bores 54, and a pair of internally threaded bores 56. Still referring to FIG. 1, second clamp member 58 is generally Y-shaped and comprises a trunk or foundation 60 having a first side 62, a generally U-shaped recess 64 within first side 62, and an externally threaded bolt 66 fixed to trunk or foundation 60 and extending within U-shaped groove 64 and from first side 62; a first fork or branch 70, an unthreaded bore 72, and an internally threaded bore 74; a second fork or branch 76 having an unthreaded bore 72, and an internally threaded bore 74; and a generally V-shaped groove 82 defined by first and second forks 70 and 76. A plurality of externally threaded bolts 84 (four are shown) are used to pass through respective unthreaded bores 54 and 72 and engage respective internally threaded bores 56 and 74 to secure first clamp member or bracket 32 to second clamp member or bracket 58 and allow the generally V-shaped grooves 52 and 82 to grip the boat hook pole 12 to securely lock clamp (connector) assembly 30 to pole 12. A pair of flat plates 86, each having an inside surface 90 with one or more recess(es) 92 within the inside surface 90, which recess(es) 92 are complementary to respective U-shaped recesses 40 and 64 in first and second clamp members 32 and 58, an unthreaded bore 94, and a bevelled edge 96. A pair of internally threaded wing nuts 98 for engaging respective externally threaded bolts 42 and 66 which pass through respective unthreaded bores 94 in respective plates 86. The flushing device 14 is secured to a selective one of first clamp member or bracket 32 or second clamp member or bracket 58 by removing a wing nut 98 and a plate 86 and placing the generally U-shaped intermediate section 18 within a respective, selected, U-shaped recess 40 or 64, replacing the removed plate 86 on the selected first clamp member 32 or second clamp member 58, so that the walls of recess(es) 92 engage the U-shaped intermediate section 18 of flushing device 14, at which time the wing nut 98 is turned to cause plate 86 to firmly secure flushing device 14 to clamp (connector) assembly 30. As is apparent, the inclusion of the recesses 92 in the inside surface 90 of plates 86 is optional in that the inside surface 90 of plate 86 would engage the intermediate section 18 of flushing device 14 to securely hold flushing device 14. If the recesses 92 are omitted from plates 86, it is possible that the recesses 40 and 64 may have to be made a little deeper.

Figure 3:
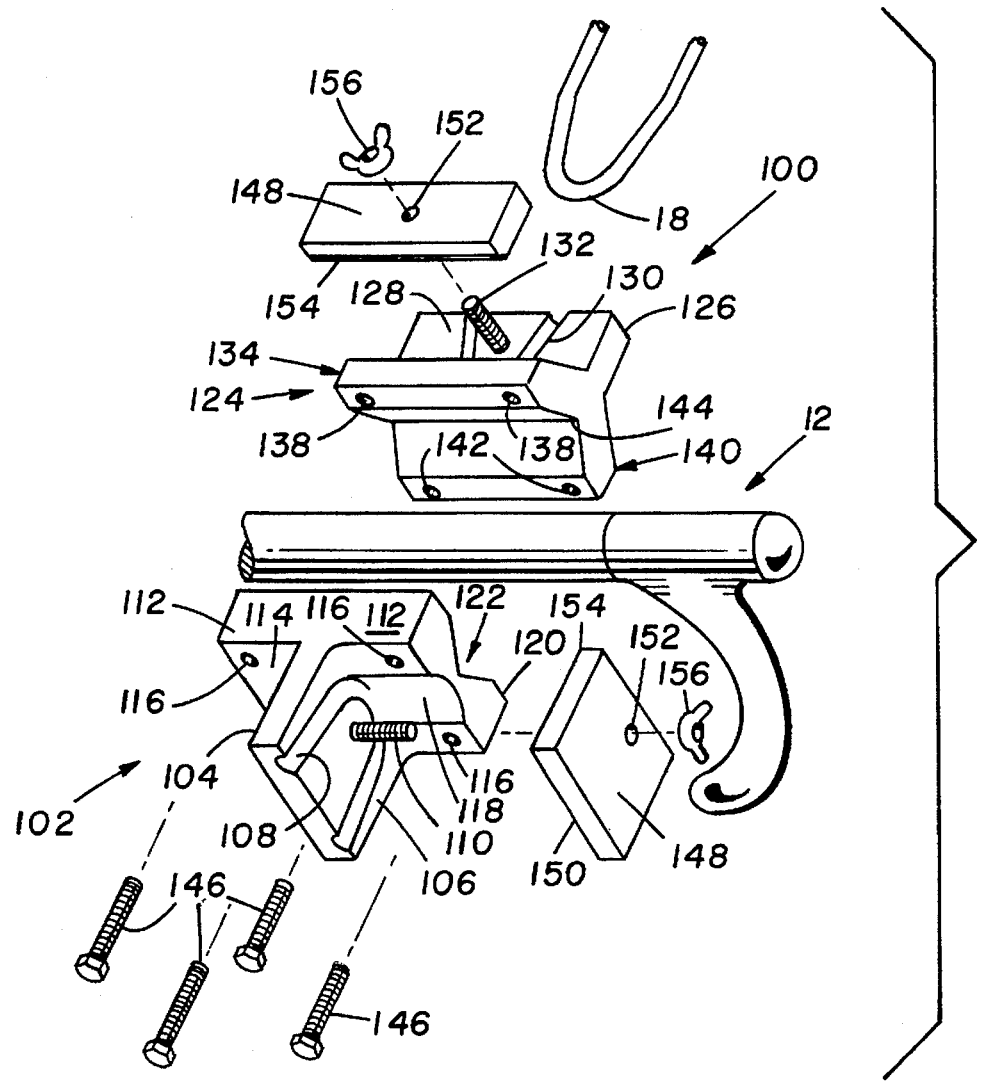
FIG. 3 is an exploded, partially broken away, perspective, view of a second embodiment of the clamp (connector) assembly of the present invention together with a partially broken away boat hook pole and flushing device to be used with the clamp (connector) assembly.

Referring now to FIG. 3, a second embodiment of the invention is designated by reference numeral 100. Universal clamp (connector) assembly 100 comprises a first clamp member or bracket 102, a second clamp member or bracket 124, a plurality of externally threaded bolts 146, a pair of plates 148, and a pair of wing nuts 156. Referring still to FIG. 3, first clamp member 102 is generally T-shaped and comprises a foundation 104 having a first side surface 106, a generally U-shaped recess 108 in first side surface 106, and an externally threaded bolt 110 fixed to foundation 104 and extending within U-shaped recess 108, and from first side surface 106; and a pair of arms 112 fixed to foundation 104 and having an outside surface 114 which includes an arcuate groove 118, an inside surface 120 having a generally V-shaped groove 122, and four unthreaded bores 116. Still referring to FIG. 3, second clamp member 124 is generally Y-shaped and comprises a trunk or foundation 126 having a first side 128, a generally U-shaped recess 130 within first side 128, and an externally threaded bolt 132 fixed to trunk or foundation 126 and extending within U-shaped groove 130 and from first side 128; a first fork or branch 134, and two internally threaded bores 138; a second fork or branch 140 having two internally threaded bores 142; and a generally V-shaped groove 144 defined by first and second forks 134 and 140. A plurality of externally threaded bolts 146 (four are shown) are used to pass through respective unthreaded bores 116 and engage respective internally threaded bores 138 to secure first clamp member or bracket 102 to second clamp member or bracket 124 and allow the generally V-shaped grooves 122 and 144 to grip the boat hook pole 12 to securely lock clamp (connector) assembly 100 to pole 12. A pair of flat plates 148, each having an inside surface 150, an unthreaded bore 152, and a bevelled edge 154. A pair of internally threaded wing nuts 156 for engaging respective externally threaded bolts 110 and 132 which pass through respective unthreaded Bores 152 in respective plates 148. The flushing device 14 is secured to a selective one of first clamp member or bracket 102 or second clamp member or bracket 124 by removing a selected wing nut 156 and plate 148 and placing the generally U-shaped intermediate section 18 within a respective, selected, U-shaped recess 108 or 130, replacing the removed plate 148 on the selected first clamp member 102 or second clamp member 124, so that the inner flat surface 150 of plate 148 engages the U-shaped intermediate section 18 of flushing device 14, at which time the wing nut 156 is turned to cause plate 148 to firmly secure flushing device 14 to clamp (connector) assembly 100.

As is readily apparent, if a user desired to remotely place the flushing device 14 over the inlet ports of the outdrive of a motor from either above (twelve o'clock position) or below (six o'clock position) of the motor, the user would secure the flushing device 14 to the first clamp member 32 in the embodiment depicted in FIGS. 1 and 2 or to the first clamp member 102 in the embodiment depicted in FIG. 3. As is further readily apparent, if a user desired to remotely place the flushing device 14 over the inlet ports of the outdrive of a motor from either the right side (three o'clock position) or the left side (nine o'clock position) of the motor as seen from behind the motor, the user would secure the flushing device 14 to the second clamp member 58 in the embodiment depicted in FIGS. 1 and 2 or to the second clamp member 124 in the embodiment depicted in FIG. 3.

"A third embodiment of the universal clamp (connector) assembly of the present invention is designated by the reference numeral 230 in FIG. 5 for use with a pole 212 and flushing device 214. As best shown in FIG. 5, universal clamp (connector) assembly 230 comprises a first clamp member or bracket 232, a second clamp member or bracket 258, one or more plates 286, and a plurality of wing nuts 298. First clamp member 232 is generally inverted L-shaped and comprises a first leg 234 having an upper surface 235 with an opening 239, a notch 243, and a curved surface 245; and a second leg 244 fixed to first leg 234 and having an outside surface 246, an inside surface 250 having a generally U-shaped groove 252, and a pair of spaced holes 253 through second leg 244. As still best shown in FIG. 5, second clamp member 258 is generally Y-shaped and comprises a trunk or foundation 260 having a first side 262, a notch 263 and a hole 265 extending through trunk 260; a first fork or branch 270 having an externally threaded bolt 271 secured thereto; a second fork or branch 276 having an externally threaded bolt 277 secured thereto; and a generally U-shaped groove 282 defined by first and second forks 270 and 276. One or more plates 286 having an inside surface 290, a first projection 291 extending from inside surface 290, an externally threaded bolt 293 extending from inside surface 290, and a second curved projection 295 extending from inside surface 290 is provided for securing flushing device 214 to a selected one of first clamp member or bracket 232 or second clamp member or bracket 258 by placing and tightening a wing nut 298 upon the threads of externally threaded bolt 293. Clamp assembly 230 is secured to pole 212 by passing the externally threaded bolts 271 and 277 of second clamp member 258 through respective holes 253 in first clamp member 232 and placing a wing nut 298 on each of threaded bolts 271 and 277 and manipulating same thereon to draw first and second clamp members 232 and 258 toward each other until the surfaces of U-shaped grooves 252 and 282 tightly grip the pole 212. When the flushing device 214 is secured to a selected one of first clamp member 232 or second clamp member 258, the first projection 291 of plate 286 fits within a respective notch 243 or 263 when a wing nut is tightened onto externally threaded bolt 293. While two plates 286 are shown in FIG. 5, only one such plate 286 is required as it can be mounted on either of first or second clamp member 232 or 258.

Although I have shown specific construction and arrangement of the parts and features constituting preferred embodiments of the invention, changes may be made in the parts and features without affecting the operativeness of the invention. For example, it is readily apparent that the shapes of many parts or features may be otherwise than the shapes specifically set forth herein. It will therefore be obvious to those skilled in the art that various modifications may be made without departing from the spirit of the invention. It is also readily apparent that either embodiment of the clamp assembly of this invention can be mounted on any type of elongated pole and need not be mounted on a boat hook pole as shown and described. Having fully described the invention and the presently preferred embodiments thereof.

I claim:

1. A universal clamp assembly for remotely positioning, from a plurality of directions, a device on a predetermined location on a member, said clamp assembly comprising:

first retaining means for retaining the device on said clamp assembly in a first orientation, said first retaining means including a first leg and a second leg;

second retaining means for alternatively retaining the device on the clamp assembly in a second orientation; and clamping means adapted to receive a remotely manipulated member for remote manipulation of said clamp assembly whereby said device may be directed to said predetermined location from a plurality of directions.

2. The universal clamp assembly of claim 1 wherein said second retaining means includes a foundation, a first fork and a second fork.

3. The universal clamp assembly of claim 2 wherein said second leg of said first retaining means has an inside surface and each of said first and second forks of said second retaining means has an inside surface and wherein said clamping means adapted to receive said remotely manipulated member includes said inside surfaces of said first and second retaining means.

4. The universal clamp assembly of claim 3 wherein each said first retaining means and said second retaining means includes a bolt, a flat plat and a wing nut.

5. The universal clamp assembly of claim 3 wherein said first retaining means is generally T-shaped and said second retaining means is generally Y-shaped.

6. The universal clamp assembly of claim 1 wherein said first retaining means includes means associated with said first leg for securing the device to said first leg.

7. The universal clamp assembly of claim 6 wherein said second retaining means includes a first fork, a second fork, a foundation, and means associated with said foundation for securing the device to said foundation.

8. The universal clamp assembly of claim 7 wherein each said means associated with said first leg and said foundation for securing the device thereto includes a plate, a threaded bolt and a threaded nut.

9. The universal clamp assembly of claim 8 wherein said second leg of said first retaining means has an inside surface and each of said first and second forks of said second retaining means has an inside surface and wherein said clamping means adapted to receive said remotely manipulated member includes said inside surfaces of said first and second retaining means.

10. A universal clamp assembly for remotely supporting and positioning a marine motor flushing apparatus in releasably secured relation over water intake ports of the outdrive of the marine motor, said clamp assembly disposed for permitting access of the flushing apparatus with the water intake ports from a plurality of directions and comprising:

first bracket means for receiving the flushing apparatus therein in a first orientation;

second bracket means for alternatively receiving the flushing apparatus therein in a second orientation, said second bracket means disposed for secured relation with said a first bracket means;

said first and second bracket means forming a channel therebetween responsive to the secured relation thereof, said channel defining a clamping means adapted for receiving an elongated pole in clamped relation therein, said pole having an extending portion for gripped engagement by a user whereby said universal clamp assembly may be placed in a desired position relative to the water intake ports of the outdrive of the marine motor for positioning of the flushing apparatus over the water intake ports.

11. The universal clamp assembly of claim 10 wherein said first bracket means includes a first leg, a second leg, and an externally threaded bolt extending from said first leg.

12. The universal clamp assembly of claim 11 wherein said second bracket means includes a foundation, an externally threaded bolt extending from said foundation, a first fork, and a second fork.

13. The universal clamp assembly of claim 12 wherein a flat plate and wing nut engages a selected one of said externally threaded bolts and the flushing apparatus to secure the flushing apparatus to a selected one of said bracket means.

14. A universal clamp assembly for remotely supporting and positioning a marine motor flushing device in releasably secured relation over water inlet ports of an outdrive of the marine motor, said clamp assembly being adapted to be mounted on an elongated pole and being disposed for permitting access of the flushing device with the water inlet ports remotely from a plurality of directions and comprising:

a first clamp member including a first leg having an upper surface, a generally U-shaped recess in said upper surface of said first leg, an externally threaded bolt fixed to said first leg within said generally U-shaped recess and extending from said upper surface, and a second leg;

a second clamp member including a foundation having a first side surface, a generally U-shaped recess in said first side surface of said foundation, an externally threaded bolt fixed to said foundation within said generally U-shaped recess and extending from said first side surface, a first fork, and a second fork;

means for securing said first clamp member to said second clamp member;

means for selectively engaging the flushing device to secure the flushing device to a selected one of said upper surface of said first leg of said first clamp member and said first side surface of said foundation of said second clamp member; and clamping means for releasably securing said elongated pole to said clamp assembly for permitting access of the flushing device with the water inlet ports remotely from a plurality of directions.

15. The universal clamp assembly of claim 14 wherein said second leg includes an inside surface and said clamping means includes a generally V-shaped groove within said inside surface of said second leg.

16. The universal clamp assembly of claim 15 wherein said clamping means further comprises a generally V-shaped groove.

17. The universal clamp assembly of claim 16 wherein said means for securing said first clamp member to said second clamp member includes a plurality of externally threaded bolts.

18. The universal clamp assembly of claim 17 wherein said means for selectively securing the flushing device to a selected one of said upper surface of said first leg of said first clamp member and said first side surface of said foundation of said second clamp member includes a generally flat plate and a wing nut for engagement with a selected one of said externally threaded bolt fixed to said first leg of said first clamp member and said externally threaded bolt fixed to said foundation of said second clamp member.

19. The universal clamp assembly of claim 18 wherein said second clamp member is generally Y-shaped.

20. The universal clamp assembly of claim 19 wherein said first clamp member is generally L-shaped.

21. The universal clamp assembly of claim 19 wherein said first clamp member is generally T-shaped with said foundation forming a base of the T and said first leg comprising one arm of the T.

22. A universal clamp assembly for remotely supporting and positioning a marine motor flushing device in releasably secured relation over water inlet ports of an outdrive of the marine motor, said clamp assembly being adapted to be mounted on an elongated pole and being disposed for permitting access of the flushing device with the water inlet ports remotely from a plurality of directions and comprising:

a first clamp member including a first leg having an upper surface, and a second leg having an inside surface;

a second clamp member including a foundation having a first side surface, a first fork and a second fork;

means for securing said first clamp member to said second clamp member;

means for selectively engaging the flushing device to secure the flushing device to a selected one of said upper surface of said first leg of said first clamp member and said first side surface of said foundation of said second clamp member; and clamping means including a groove within said inside surface of said second leg of said first clamp member and a groove defined by said first and second forks of said second clamp member for releasably securing said elongated pole to said clamp assembly for permitting access of the flushing device with the water inlet ports remotely from a plurality of directions.

23. The universal clamp assembly of claim 22 wherein said means for securing said first clamp member to said second clamp member includes a plurality of externally threaded bolts.

24. The universal clamp assembly of claim 23 wherein said means for selectively securing the flushing device to a selected one of said upper surface of said first leg of said first clamp member and said first side surface of said foundation of said second clamp member includes a plate and a nut for engagement with an externally threaded bolt associated with said first leg of said first clamp member and an externally threaded bolt associated with said foundation of said second clamp member.

* * * * *